Oct. 25, 1949.　　　F. D. WEBSTER　　　2,486,084
VALVE STEM PULLER
Filed June 10, 1947
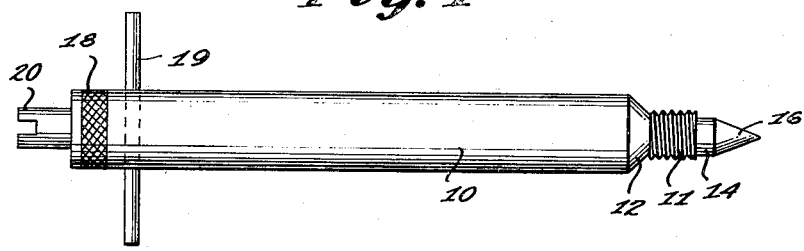
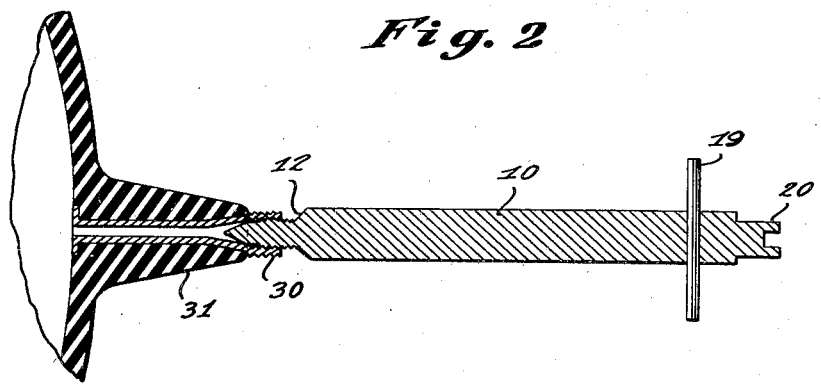
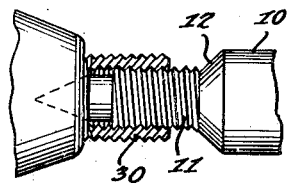
Inventor
FRANCIS D. WEBSTER
By
McMorrow, Berman & Davidson
Attorneys Patented Oct. 25, 1949

2,486,084

UNITED STATES PATENT OFFICE 2,486,084

VALVE STEM PULLER

Francis D. Webster, Wateska, Ill.

Application June 10, 1947, Serial No. 753,662

1 Claim. (Cl. 81—3)

This invention relates to devices for facilitating the mounting of automobile tires on rims, and more particularly to a tool for pulling the valve stem of the inner tube through the rim.

In the usual procedure of installing an automobile tire on a rim, the operator first mounts one bead of the tire on the rim, and then inserts the inner tube within the tube. It is then necessary to insert one hand between the other tire bead, which has not yet been installed on the rim, and the rim, and to push the valve stem through the valve hole in the rim. With the other hand the operator applies a valve tool to the valve stem from the outside. It is then possible to mount the other bead of the tire on the rim. This procedure is awkward and painful.

Accordingly, a principal object of this invention is to provide a tool for pulling the valve stem through the hole in the rim.

The accompanying drawings illustrate a preferred embodiment of the invention, but it is understood that modifications may be made therein without departing from the spirit of the invention as hereinafter claimed.

Figure 1 is a front elevation of the new and improved tool.

Figure 2 is a view, in section, of the tool as applied to a valve stem, with the inside of the valve stem omitted.

Figure 3 is an enlarged view, partially in section, of the cooperating parts of the tool and the valve stem.

The new and improved tool comprises a cylindrical body 10, that may be solid or hollow. One end of the tool is provided with a threaded portion 11 adapted to mesh with the inside of a valve stem. The body 10 is of greater cross-section than the threaded portion 11, the intermediate portion 12 being tapered to provide a seat for the tool on the valve stem.

Extending from the threaded portion 11 is a smooth cylindrical portion 14, of smaller diameter than the threaded portion 11. The smooth portion 14 is intended to serve as a means for aligning the tool in the valve stem for the purpose of facilitating the purchase of the threaded portion 11 with the inside of the valve stem. Extending outwardly from the smooth portion 14 is a pointed tip 16 to serve as a starter.

The opposite end of the tool is provided with a knurled portion 18 to serve as a finger grip. It may also be provided with a perpendicular pin 19 to serve as a handle, and the pin 19 may be either permanently attached to the body 10 or may be removable therefrom. The same end of the tool may also be provided with a valve core extractor 20.

In the operation of the device, the valve stem 30 of the inner tube 31 is properly aligned on the inside of the rim with the valve opening in the rim. The tool is then applied from the outside until the threaded portion 11 is engaged with the inside of the valve stem 30. It is then a simple matter to pull the tool until the valve stem 30 is in proper position.

What is claimed is:

A tool for pulling an inner tube valve stem through a valve stem receiving hole in a tire rim comprising an elongated cylindrical body of a size to pass freely through a valve stem receiving hole in a tire rim, an externally screw-threaded extension of reduced diameter on one end of said cylindrical body, said extension being of a size to thread into a valve stem and having a tapered, conical portion at its outer end to facilitate inserting said extension into a valve stem, a tapered annular shoulder between said body and said extension providing a seat for the end of a valve stem into which said extension is threaded, and a handle carried by said body near the end thereof remote from said extension.

FRANCIS D. WEBSTER.

REFERENCES CITED

The following references are of record in the file of this patent:

UNITED STATES PATENTS

| Number | Name | Date |
|---|---|---|
| 1,308,219 | Brucker | July 1, 1919 |

FOREIGN PATENTS

| Number | Country | Date |
|---|---|---|
| 308,455 | Great Britain | Mar. 28, 1929 |